(12) United States Patent
Han

(10) Patent No.: US 12,213,228 B2
(45) Date of Patent: Jan. 28, 2025

(54) SYSTEM AND METHOD FOR CONTROLLING LAMP OF VEHICLE

(71) Applicant: HYUNDAI MOBIS CO., LTD., Seoul (KR)

(72) Inventor: Seong Yeon Han, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 280 days.

(21) Appl. No.: 17/940,051

(22) Filed: Sep. 8, 2022

(65) Prior Publication Data

US 2023/0089333 A1  Mar. 23, 2023

(30) Foreign Application Priority Data

Sep. 17, 2021 (KR) .................. 10-2021-0124828

(51) Int. Cl.
*G10L 15/22* (2006.01)
*H05B 47/12* (2020.01)
*H05B 47/155* (2020.01)

(52) U.S. Cl.
CPC .............. *H05B 47/12* (2020.01); *G10L 15/22* (2013.01); *H05B 47/155* (2020.01); *G10L 2015/223* (2013.01)

(58) Field of Classification Search
None
See application file for complete search history.

(56) References Cited

U.S. PATENT DOCUMENTS

| | | | |
|---|---|---|---|
| 2004/0215464 A1* | 10/2004 | Nelson | B60R 16/0373 704/275 |
| 2013/0150726 A1* | 6/2013 | Riley | A61B 5/0059 600/473 |
| 2016/0234594 A1* | 8/2016 | Ogura | B60R 11/0247 |
| 2021/0082401 A1* | 3/2021 | Kim | G06F 40/242 |
| 2022/0240356 A1* | 7/2022 | Lee | H05B 45/34 |

\* cited by examiner

*Primary Examiner* — Quynh H Nguyen
(74) *Attorney, Agent, or Firm* — NovoTechIP International PLLC

(57) ABSTRACT

A system and a method for controlling a lamp of a vehicle are provided, The system includes a voice recognition device to recognize a voice signal from a user, a voice analyzing device to analyze context of the recognized voice signal to determine a lamp device to be controlled, and to determine a control intent of the user with respect to the determined lamp device, and a controller to control the lamp device, based on the determined control intent of the user.

16 Claims, 18 Drawing Sheets

SYSTEM AND METHOD FOR CONTROLLING LAMP OF VEHICLE

CROSS-REFERENCE TO RELATED APPLICATIONS

This application claims the benefit of priority to Korean Patent Application No. 10-2021-0124828, filed in the Korean Intellectual Property Office on Sep. 17, 2021, the entire contents of which are incorporated herein by reference.

TECHNICAL FIELD

The present disclosure relates to a system and a method for controlling a lamp of a vehicle.

BACKGROUND

In general, a vehicle is equipped with lamp devices such as an outdoor lamp including a head lamp or a rear lamp, and an indoor lamp. In addition, the vehicle is equipped with various types of lamp devices. A user has to handle a specific button or a specific lever for each lamp device. Since the lamp devices employ various control schemes, it is difficult for a user to acquire a control scheme for each lamp device within a shorter period of time.

In addition, in a conventional lamp device, a lighting pattern set at an initial stage is fixed. Accordingly, it is not easy for the user to change the lighting pattern.

Recently, lamp devices have been realized such that each lamp device is controlled through a screen of a graphical user interface (GUI) input device to change a lighting pattern of the lamp device. However, it is not easy for the user to change the lighting pattern during the driving. When the user changes an external lighting pattern of the vehicle, it is not easy for the user to determine in real time whether the change result of the lighting pattern is reflected, until the user personally identifies the lighting pattern after getting off the vehicle.

SUMMARY

The present disclosure has been made to solve the above-mentioned problems occurring in the prior art while advantages achieved by the prior art are maintained intact.

An aspect of the present disclosure provides a system and a method for controlling a lamp of a vehicle, capable of easily controlling the lamp of the vehicle by using a voice recognition function.

Another aspect of the present disclosure provides a system and a method for controlling a lamp of a vehicle, capable of exactly determining a control intent of a user through the conversation with the user, when performing a voice recognition function, and controlling a lamp device based on the determined control intent of the user, thereby improving the satisfaction of the user.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for controlling a lamp of a vehicle includes a voice recognition device to recognize a voice signal from a user, a voice analyzing device to analyze the recognized voice signal to determine a lamp device to be controlled, and to determine a control intent of the user with respect to the determined lamp device, and a controller to control the lamp device, based on the determined control intent of the user.

The lamp device includes at least one of an indoor lamp provided inside the vehicle, a head lamp, a rear lamp, a vehicle body lamp, or a lamp for displaying information on a road surface.

The voice analyzing device determines whether the control intent of the user for the lamp device is to merely control an "on" state or "off" state.

The controller controls the "on" state or the "off" state for the lamp device when the control intent of the user is to merely control the "on" state or "off" state.

The controller outputs an additional question to determine the control intent of the user when the control intent of the user is not to merely control the "on" state or "off" state.

The controller adjusts at least one of brightness or a color for the lamp device, when the control intent of the user is a request, by the user, for changing at least one of the brightness or the color for the lamp device.

The controller generates a vehicle body display message and outputs the vehicle body message to a vehicle body lamp when the control intent of the user is a request for displaying information on a vehicle body.

The controller generates a road surface display message and outputs the road surface display message to a lamp for displaying the information on the road surface when the control intent of the user is a request for displaying information on a road surface.

The controller may be connected to a media device or a server to request sharing a screen for media content, when the control intent of the user is a request for displaying media content, and outputs the shared screen to the lamp device.

The controller is connected to the server to update relevant software when the control intent of the user is a request for updating the software.

According to another aspect of the present disclosure, a method for controlling a lamp of a vehicle includes recognizing a voice signal from a user, determining a lamp device to be controlled by analyzing the recognized voice signal, and determining a control intent of the user with respect to the determined lamp device, and controlling the lamp device, based on the determined control intent of the user.

The lamp device includes at least one of an indoor lamp provided inside the vehicle, a head lamp, a rear lamp, a vehicle body lamp, or a lamp for displaying information on a road surface, which is provided outside the vehicle.

The determining of whether the control intent of the user includes determining whether the control intent of the user for the lamp device is to merely control an "on" state or "off" state.

The controlling of the lamp device includes controlling the "on" state or "off" state for the lamp device when the control intent of the user is to merely control the "on" state or "off" state.

The controlling of the lamp device further includes outputting an additional question to determine the control intent of the user when the control intent of the user is not to merely control the "on" state or "off" state.

The controlling of the lamp device includes adjusting at least one of a brightness or a color for the lamp device, when the control intent of the user is a request, by the user, for changing at least one of the brightness or the color for the lamp device.

The controlling of the lamp device includes generating a vehicle body display message and outputting the vehicle body message to a vehicle body lamp when the control intent of the user is a request for displaying information on a vehicle body.

The controlling of the lamp device includes generating a road surface display message and outputting the road surface display message to a lamp for displaying the information on the road surface when the control intent of the user is a request for displaying information on a road surface.

The controlling of the lamp device includes requesting sharing a screen for media content through connection to a media device or a server and outputting the shared screen to a relevant lamp device when the control intent of the user is a request for displaying media content.

In addition, according to an embodiment of the present disclosure, the method further includes updating software through connection to a server, when the control intent of the user is an update request.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
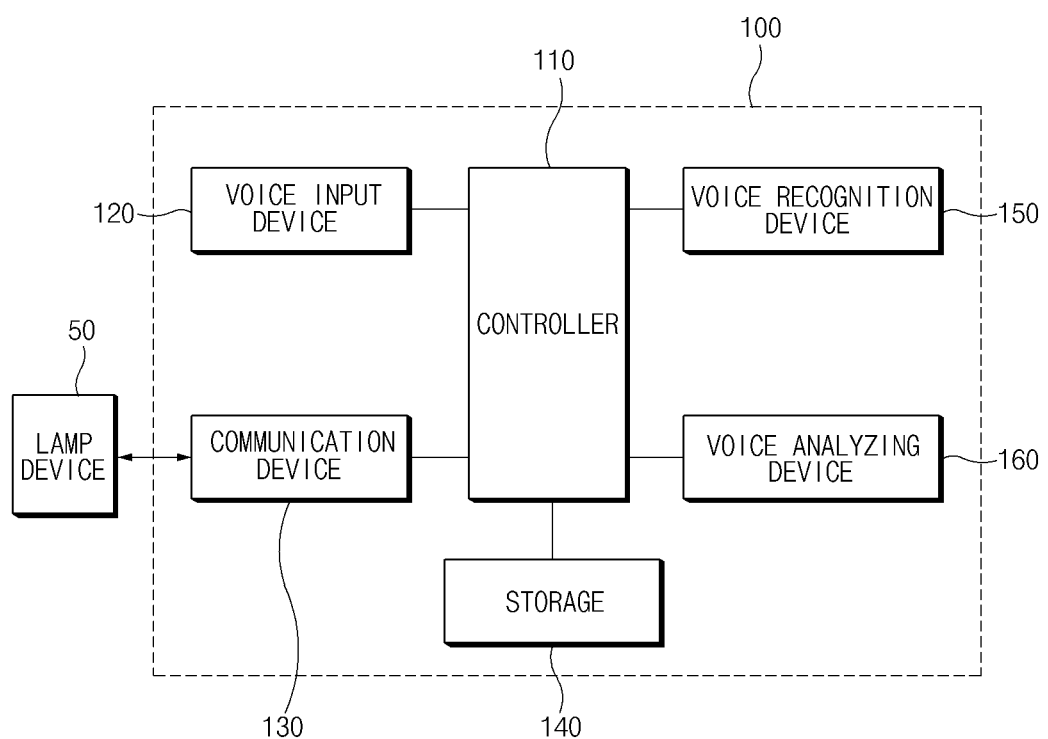
FIG. 1 is a view illustrating a configuration of a system for controlling a lamp of a vehicle, according to an embodiment of the present disclosure.

Hereinafter, some embodiments of the present disclosure will be described in detail with reference to the accompanying drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in the following description of components according to an embodiment of the present disclosure, the terms 'first,' 'second,' 'A,' 'B,' '(a),' and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a configuration of a system for controlling a lamp of a vehicle, according to an embodiment of the present disclosure.

Referring to FIG. 1, according to the present disclosure, a system (hereinafter, a lamp control system) for controlling a lamp of a vehicle may include a controller 110, a voice input device 120, a communication device 130, a storage 140, a voice recognition device 150, and a voice analyzing device 160.

In this case, the controller 110, the voice recognition device 150, and/or the voice analyzing device 160 may be a hardware device, such as a processor or a central processing unit (CPU), or a program implemented by a processor.

The controller 110 may be connected to each component of the lamp control system to perform an overall function of the lamp control system.

The voice input device 120 may include an input device to receive a control command from a user and an output device to output the operation state and the operation result of the lamp control system 100.

In this case, the input device may include a microphone to receive a voice input from a user. For example, the microphone may receive a voice corresponding to a lamp control command from the user. The microphone may output, to the controller 110, a voice signal corresponding to the voice which is input, when the voice of the user is input. Accordingly, the controller 110 may transmit the voice signal received from a voice input device, to the voice recognition device 150.

In addition, the input device may include a key button, and may include a soft key implemented on a display. In this case, the input device may include a mouse, a joystick, a jog shuttle, a stylus pen, or the like.

The output device may include a display and may include a voice output device such as a speaker. For example, the display may display a screen allowing the user to recognize an additional question generated by the controller 110, to determine the control intent of the user. In addition, the speaker may output, in the form of the voice, the additional question generated by the controller 110.

In this case, when a touch sensor, such as a touch film, a touch sheet, a touch pad, or the like, is included in the display, the display may operate as a touch screen, and the input device and the output device may be implemented in the integral form.

In this case, the display may include at least one of a liquid crystal display (LCD), a thin film transistor-liquid crystal display (TFT LCD), an organic light-emitting diode (OLED), a flexible display, a field emission display (FED), or a three dimensional display (3D display).

The communicator 130 may include a communication module to communicate with electronic parts and/or controllers provided in a vehicle.

For example, the communication module may be connected to lamp devices 50 provided in the vehicle to transmit a control signal from the controller 110 to the lamp device 50. In this case, the vehicle network communication technology may include a controller area network (CAN) communication technology, a local interconnect network (LIN) communication technology, a Flex-Ray communication technology.

Figure 2:
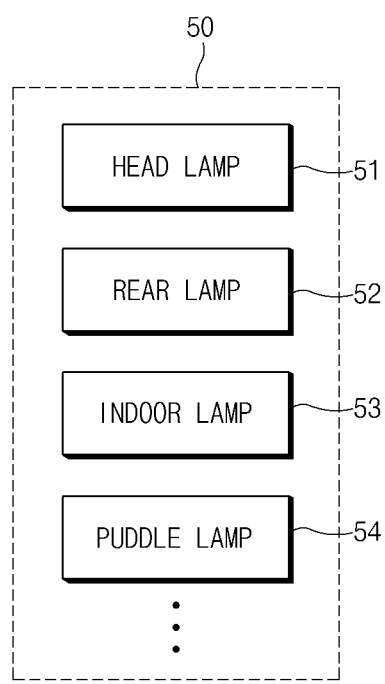
FIG. 2 is a view illustrating a lamp device, according to an embodiment of the present disclosure.

The lamp device 50 may include an outdoor lamp disposed at an exterior of the vehicle, and may include an indoor lamp provided inside the vehicle, as illustrated in FIG. 2.

For example, the outdoor lamp may include at least one of a head lamp, a rear lamp, a grill lamp, a vehicle body lamp, or a lamp for displaying information on a road surface. In addition, the indoor lamp may include at least one of a courtesy lamp, a console lamp, and an instrument panel lamp. In addition, the lamp device 50 may correspond to all types of lamp devices 50 provided inside and outside the vehicle.

In this case, the communication device 130 may further include a communication module for wireless Internet access or a communication module for short range communication.

Figure 3:
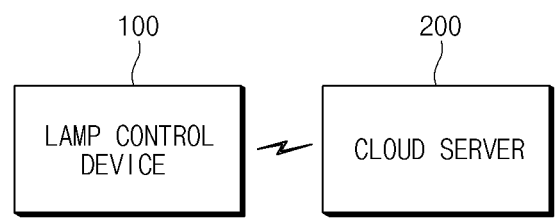
FIG. 3 is a view illustrating a connection configuration of a system for controlling a lamp of a vehicle and a server, according to an embodiment of the present disclosure.

For example, the communication module may be connected to a cloud server 200 to download specific software and/or information, and may download update data from the cloud server 200, as illustrated in FIG. 3. In addition, the communication module may be connected to a peripheral media device, such as a smartphone, through communication, and may receive information on the smartphone.

The wireless Internet technology may include a wireless LAN (WLAN), a wireless broadband (Wibro), a Wi-Fi, or World Interoperability for Microwave Access (Wimax).

The short range communication technology may include Bluetooth, ZigBee, ultra-wideband (UWB), radio frequency identification (RFID), or infrared data association (IrDA).

The storage 140 may store data and/or algorithms necessary for the lamp control system 100 of the vehicle to operate.

For example, the storage 140 may store information on each controller inside the vehicle. Alternatively, the storage 140 may store information on a vehicle state received through the communication device 130.

In addition, the storage 140 may store condition information, a command and/or algorithm for determining a final target state of control (SOC) based on the information on the vehicle state. Further, the storage 140 may store a command and/or an algorithm for updating the controllers.

In this case, the storage 140 may include a storage medium, such as a random access memory (RAM), a static random access memory (SRAM), a read only memory (ROM), a programmable read-only memory (PROM), an electrically erasable programmable read-memory, or the like.

The voice recognition device 150 recognizes a voice signal received from the controller 110. In this case, the voice recognition device 150 may recognize the voice signal based on a feature and a pattern of the voice signal of the user. The voice recognition device 150 may recognize the voice signal through an algorithm for recognizing a voice. In this case, the algorithm for recognizing the voice may include an algorithm used in a voice recognition technology, and the details thereof will be omitted to avoid redundancy.

The voice analyzing device 160 may determine a voice command of the user by analyzing the voice recognized by the voice recognition device 150, and may determine the control intent of the user for the voice command.

For example, the voice analyzing device 160 may detect a voice command of the user for the lamp device 50. In this case, the voice analyzing device 160 may determine whether the control intent of the user is to merely control an "on" state or "off" state of the lamp device 50.

The controller 110 may control an operation of a lamp device (a target lamp device) 50 to be controlled based on an analysis result of the voice analyzing device 160.

The controller 110 may generate a control signal for controlling an "on" operation or an "off" operation of the target lamp device and may transmit the control signal to the target lamp device, when the control intent of the user is to merely control the "on" state or "off" state of a target lamp device.

Therefore, the "on" operation or the "off" operation of the target lamp device may be controlled depending on an "on" control signal or an "off" control signal from the controller 110.

Meanwhile, the controller 110 may generate the additional question for exactly determining the control intent of the user and output the additional question through the display and/or the speaker of the interface 120, when the control intent of the user is not to merely control the "on" state or "off" state of the target lamp device.

In this case, the voice analyzing device 160 may exactly determine the control intent of the user, based on the answered voice input from the user to correspond to the additional question.

The voice analyzing device 160 may determine an analysis mode for determining the control intent of the user, based on the information on the state of the vehicle, the information on the surrounding of the vehicle, and/or information on an obstacle detected, and may determine the control intent of the user, based on the determined analysis mode, when the control intent of the user is not to merely control the "on" state or "off" state of the target lamp device.

In this case, the information on the state of the vehicle may include information on a parking state of the vehicle or information on a driving state of the vehicle.

The information on the surrounding of the vehicle may include information on whether the state of a surrounding road surface is an asphalt-paved road, an unpaved road, or a parking lot.

The information on the obstacle detected may include information for indicating whether a building and a road structure detected in the city center is mainly detected, trees are mainly detected, or nothing is detected in the vicinity.

The analysis mode may include a user mode, an outdoor switching mode, and a leisure mode. The user mode is a lamp control mode for supporting the activity of the user in the parking state. The outdoor switching mode is a lamp control mode which supports switching for the outdoor lamp of the vehicle. The leisure mode is a lamp control mode which supports the leisure activity of the user.

Accordingly, the voice analyzing device 160 may apply a weight to the user mode, the outdoor switching mode, or the leisure mode, based on the information on the state of the vehicle, the information on the surrounding of the vehicle, and/or the information on the obstacle detected, and may determine the control intent of the user with respect to a voice command by reflecting the weight applied to each mode.

For example, when the vehicle is in the parking state, the road surface is the parking lot, and a larger number of vehicles are detected in the vicinity, the voice analyzing device 160 may apply the weight of '3' to the user mode, the weight of '2' to the outdoor switching mode, and the weight of '1' to the leisure mode. In this case, the voice analyzing device 150 may determine the control intent of the user with respect to the voice command while focusing on the user mode.

For another example, when the vehicle is in the driving state, the road surface is the surface of the asphalt-paved road, and the larger number of vehicles are detected in the vicinity, the voice analyzing device 160 may apply the weight of '3' to the outdoor switching mode, the weight of '2' to the user mode, and the weight of '1' to the leisure mode. In this case, the voice analyzing device 150 may determine the control intent of the user with respect to the voice command while focusing on the outdoor switching mode.

For another example, when the vehicle is in the parking state, the road surface is the surface of the unpaved road, and a larger number of trees are detected in the vicinity, the voice analyzing device 160 may apply the weight of '3' to the leisure mode, the weight of '2' to the user mode, and the weight of '1' to the outdoor switching mode. In this case, the voice analyzing device 150 may determine the control intent of the user with respect to the voice command while focusing on the leisure mode.

The controller 110 may control the target lamp device, depending on the control intent of the user, when the control intent of the user is not to merely control the "on" state or "off" state of the target lamp device.

The controller 110 may transmit, to the target lamp device, a control signal for adjusting the brightness and/or the color of the target lamp device, when the control intent of the user is a request for changing the brightness and/or the color of the target lamp device. Accordingly, the target lamp device may adjust the brightness and/or the color of the whole lamps or some lamps, depending on the control signal received from the controller 110.

In addition, the controller 110 may generate a message including information to be output through the target lamp device and may transmit the message to the target lamp device, when the control intent of the user is a request for displaying information on a vehicle body or a road surface. In this case, the target lamp device may output the message, which is received from the controller 110, on a specific area of the vehicle body or the road surface.

In addition, when the control intent of the user is a request for displaying media content, the controller 110 may be connected to a peripheral media device or the cloud server 200 through the communication device 130 to request sharing a screen for the media content. In this case, when the sharing of the screen for the media content is allowed by the media device or the cloud server 200, the controller 110 may transmit the shared screen to the target lamp device.

Accordingly, the target lamp device outputs the shared screen, which is received from the controller 110, such that the shared screen is displayed on the specific area. In this case, the target lamp device may be implemented in the form of a digital lamp.

The controller 110 may reflect the information received from sensors provided in the vehicle, when controlling the target lamp device.

For example, the controller 110 may receive, through the communication device 130, illuminance information from an illuminance sensor, external weather information from a rain sensor, position information from a global positioning sensor (GPS) sensor, the information on a driver state from a camera sensor, or information on an obstacle, which is detected, around the vehicle, from a peripheral sensor.

In this case, the controller 110 may control the target lamp device, based on at least one of the illuminance information, the external weather information, the position information, the information on the driver state, or the information on the obstacle detected, which are received through the communication device 130.

For example, the controller 110 may control the head lamp and the rear lamp to be turned on, when the illuminance received from the illuminance sensor is lower illuminance, or may adjust the brightness of the head lamp and the rear lamp to be brighter than a reference level, when the head lamp and the rear lamp have been already turned on.

In addition, the controller 110 may adjust a right head lamp to be brighter, when receiving the information on the obstacle detected in a right-front portion, from a sensor to sense a surrounding.

As described above, the controller 110 may monitor information received from the sensor in real time and may reflect the information, which is sensed by the sensor, in controlling the lamp.

As described above, according to the present disclosure, the lamp control system 100 of the vehicle controls the lamp device 50 based on a voice. Accordingly, it is unnecessary for the user to know a manner of operating lamp devices 50. In addition, even if the user does not perform an individual operation specified to control the lamp device 50, the user may easily control the relevant lamp device 50 only through the voice input, which exhibits the effect of increasing the convenience of the user.

FIGS. 4A to 8C are views illustrating embodiments for an operation of a lamp control system of a vehicle, according to an embodiment of the present disclosure.

Figure 4A:
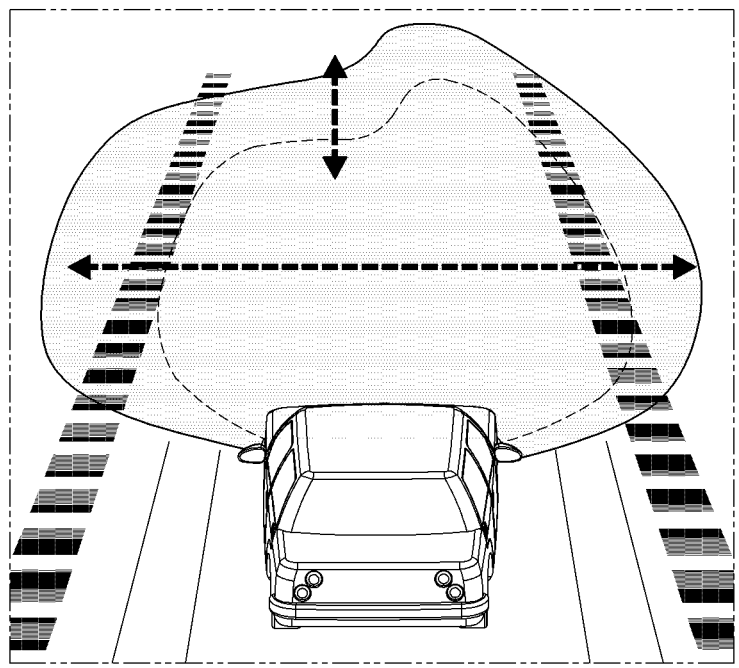
FIGS. 4A, 4B, 4C, 5, 6, 7A, 7B, 7C, 7D, 8A, 8B and 8C are views illustrating embodiments for an operation of a system for controlling a lamp of a vehicle, according to an embodiment of the present disclosure.
Figure 4B:
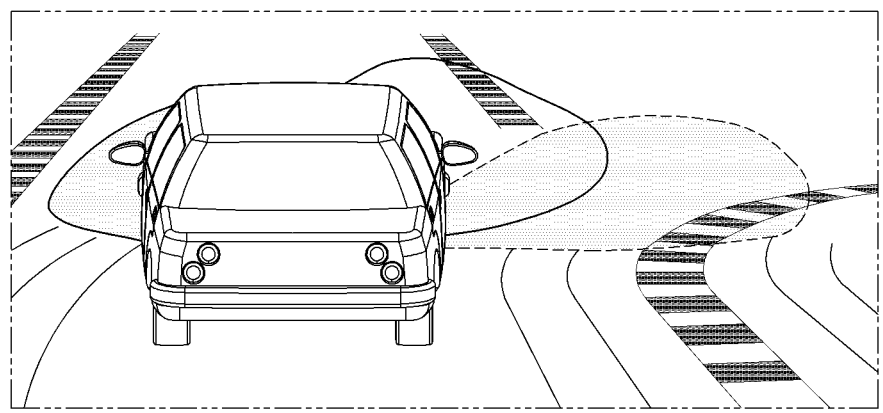
Figure 4C:
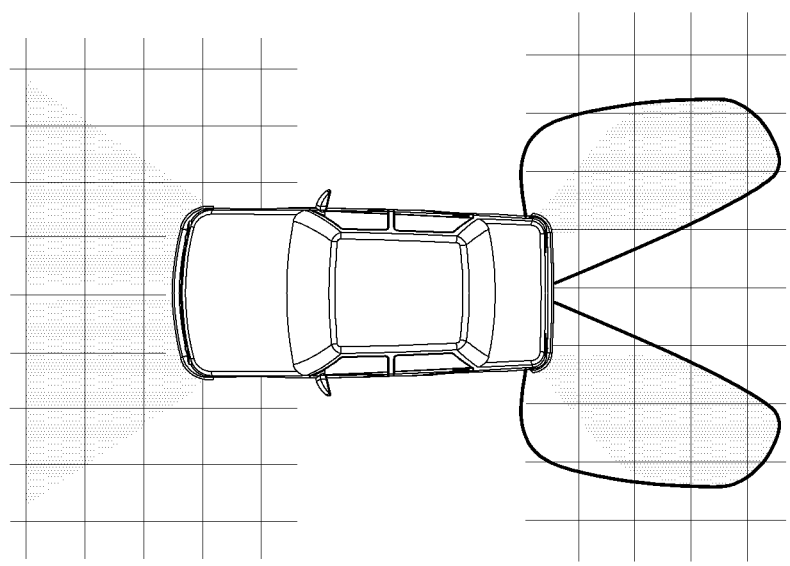

FIGS. 4A to 4C illustrate an embodiment for controlling the brightness of the lamp device 50.

As illustrated in FIG. 4A, when the vehicle travels on a road which is dark, the user may input a voice command, such as "adjust a front lamp to more brightly light a longer distance". Accordingly, the lamp control system 100 may adjust the whole brightness of the head lamp to be brighter, may control a high beam to be turned on, and may control the angle of the head lamp such that the head lamp irradiates light upward, depending on the control intent of the user. Accordingly, the lamp control system 100 may be adjusted to be brighter to the longer distance.

As illustrated in FIG. 4B, when the vehicle turns along a right curved road, the user may input a voice command such as "make a front-right lamp to be brighter". Accordingly, the lamp control system 100 may control the right head lamp to be turned on, depending on the control intent of the user, or may adjust the right head lamp to be brighter, when the right head lamp has been already turned on.

As illustrated in FIG. 4C, the user may input a voice command for adjusting the whole brightness or left/right brightness of a left head lamp, a right head lamp, a left rear lamp, and a right rear lamp. In this case, the lamp control system 100 may adjust brightness of whole lamps or some lamps of the head lamps and/or rear lamps, depending on the control intent of the user.

Figure 5:
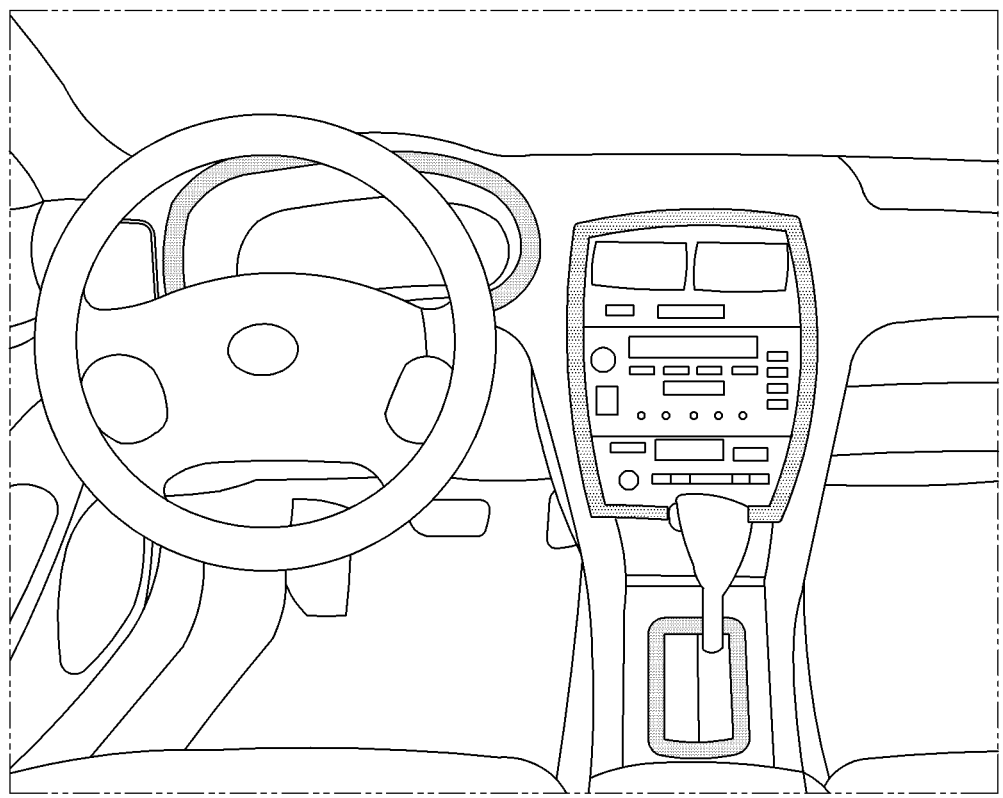

FIG. 5 is a view illustrating an embodiment for controlling the brightness and the color of the lamp device 50 interior a vehicle.

As illustrated in FIG. 5, the user may input a voice input to adjust the brightness of an indoor lamp or to change the color of the indoor lamp. Accordingly, the lamp control system 100 may adjust the brightness of the indoor lamp to be brighter or darker, depending on the control intent of the user, and may change the color of the indoor lamp to be a color requested by the user to output the changed color.

When it is difficult to output the color requested by the user, the lamp control system 100 may inform the user of that the change to the color requested by the user is difficult, and may guide changeable colors, such that the user selects any one of the guided colors. In this case, when the user selects any one color, the lamp control system 100 may change the color of the indoor lamp to the color selected by the user and output the changed color.

Figure 6:
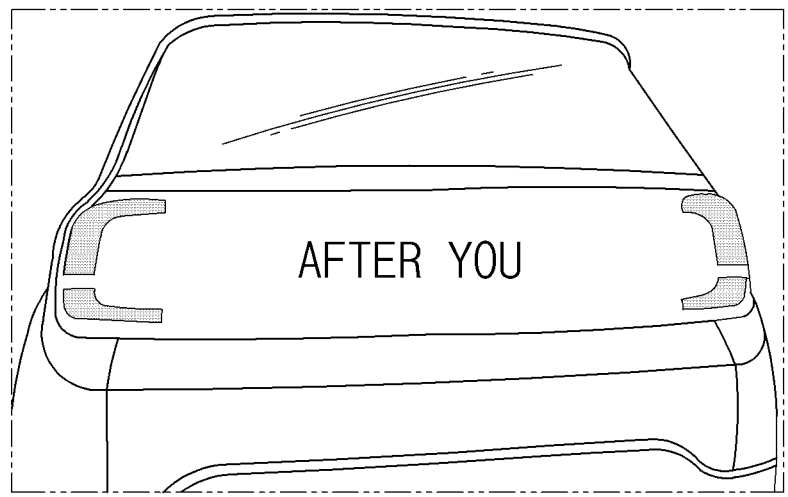

FIG. 6 is a view illustrating an embodiment for controlling a vehicle body lamp.

As illustrated in FIG. 6, the user may input a voice command for requesting displaying specific information through a vehicle body lamp. Accordingly, the lamp control system 100 may generate a vehicle body display message including information requested depending on the control intent of the user, and may perform a control operation to display the generated vehicle body display message through the vehicle body lamp. In this case, as illustrated in FIG. 6, the vehicle body lamp may be disposed on a rear surface of a vehicle and may be disposed on a front surface or a side surface of the vehicle, according to an embodiment.

For example, the user may input a voice command for requesting displaying a message for notifying a driver of a following vehicle of "After you." In this case, the lamp control system 100 may generate a vehicle body display message, such as "After you!", depending on the control intent of the user, and may display the vehicle body display message through the vehicle body lamp mounted on a rear surface of the vehicle.

FIGS. 7A to 7D are views illustrating an embodiment for controlling a lamp for displaying information on a road surface.

Figure 7A:
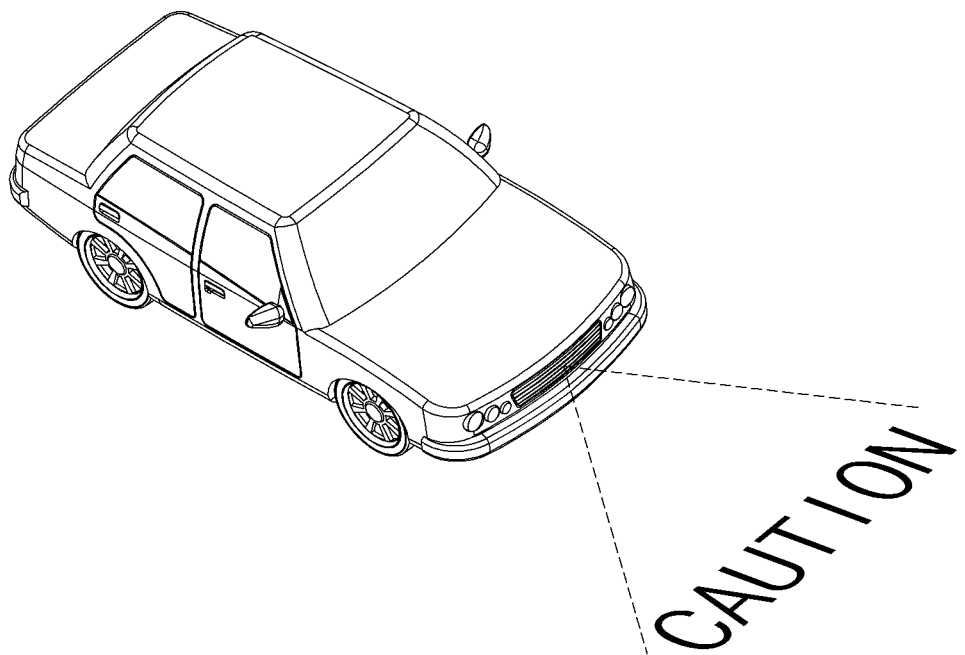
Figure 7B:
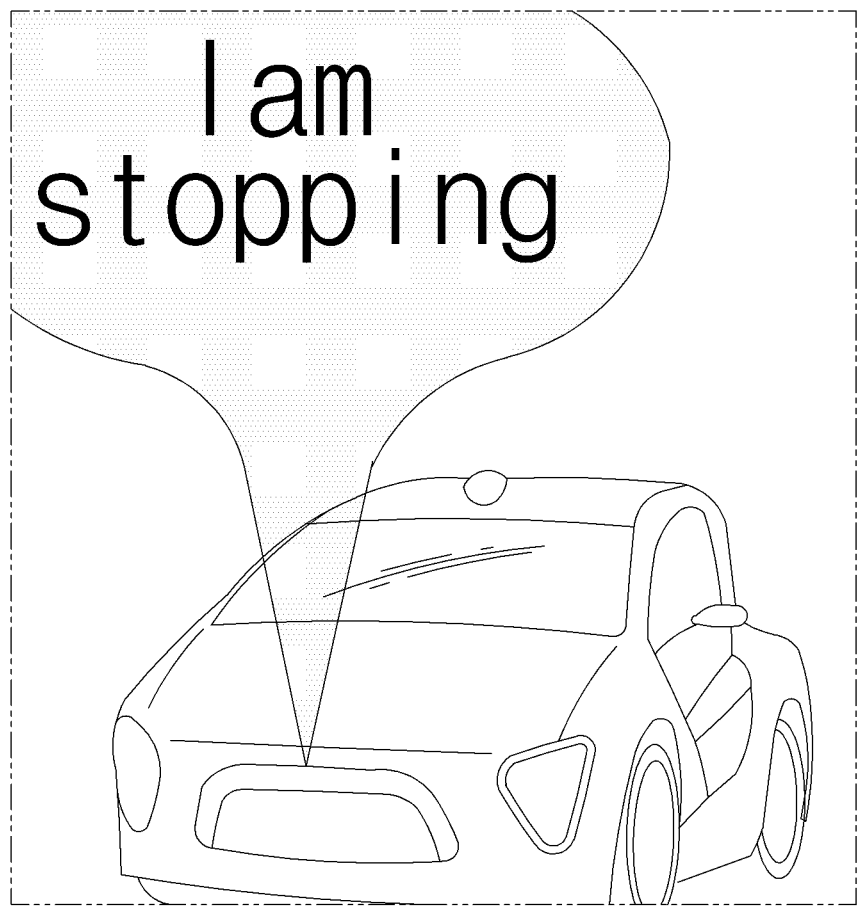
Figure 7C:
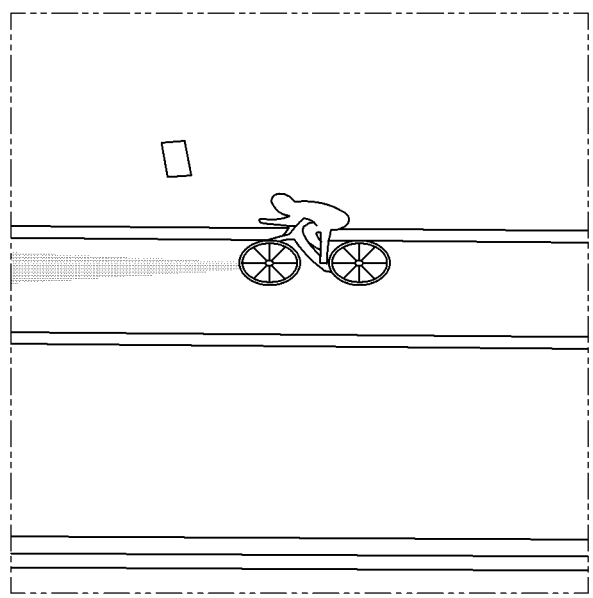
Figure 7D:
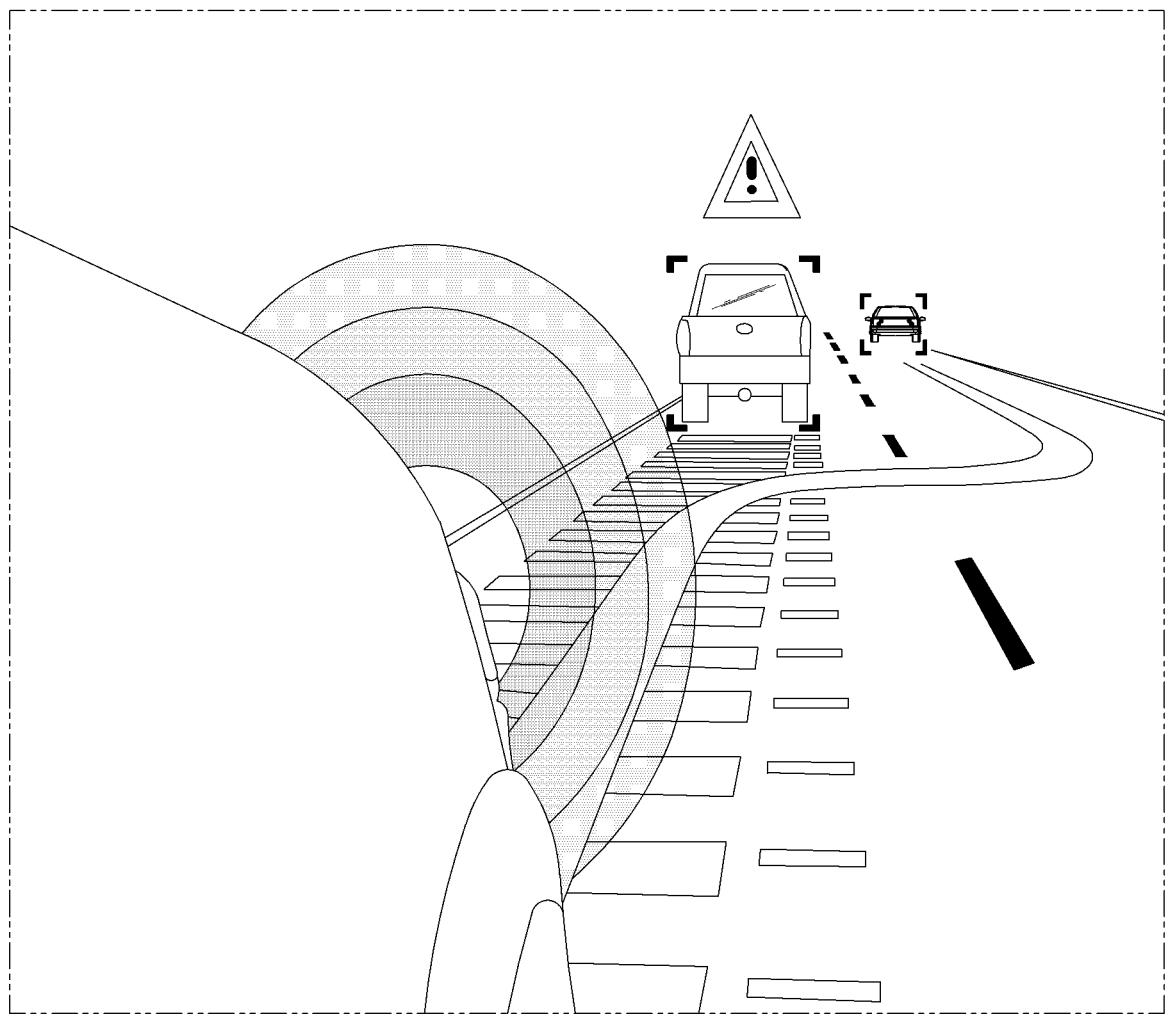

As illustrated in FIGS. 7A and 7D, the lamp for displaying the information on the road surface may project and display specific information onto a front road surface, a rear road surface, or a side road surface. In this case, the lamp for displaying the information on the road surface may project and display the specific information in the air, instead of the road surface, as illustrated in FIG. 7B.

Accordingly, the user may input the voice command for requesting displaying the specific information through the lamp for displaying the information on the road surface. Accordingly, the lamp control system 100 may generate a road surface display message including information requested depending on the control intent of the user, and may perform a control operation to display the generated road surface display message through the lamp for displaying the information on the road surface For example, the user may input a voice command for requesting displaying a message of "caution" to be warned to a pedestrian in front. In this case, the lamp control system 100 may generate a road surface display message, such as "Caution!" depending on the control intent of the user, and may display the road surface display message on the road surface through a front lamp for displaying the information on the road surface.

In addition, as illustrated in FIG. 7C, the user may input a voice command for requesting displaying a message of "caution" to be alerted to a bicycle rider in front. In this case, the lamp control system 100 may give a warning to the bicycle rider by displaying a message, such as "Caution!" on the road surface in front through a front lamp for displaying the information on the road surface, depending on the control intent of the user.

In addition, as illustrated in FIG. 7D, when the user tries to change a lane, the user may input a voice command for requesting displaying information on a lane change to give a warning to another vehicle in front or at a side of the host vehicle. In this case, the lamp control system 100 may generate a road surface display message including information on a track for a lane change, depending on the control intent of the user, and may display the road surface display message on the road surface through a lamp for displaying the information on the road surface.

Figure 8A:
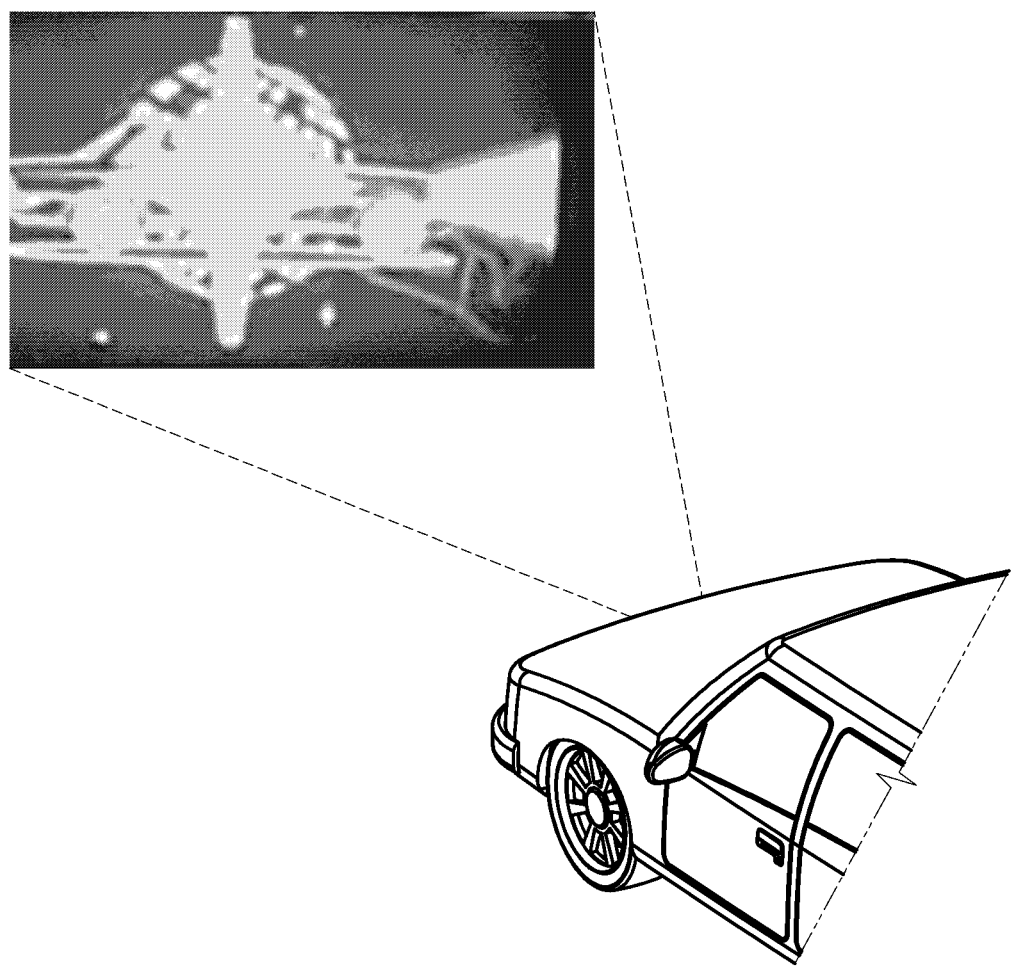
Figure 8B:
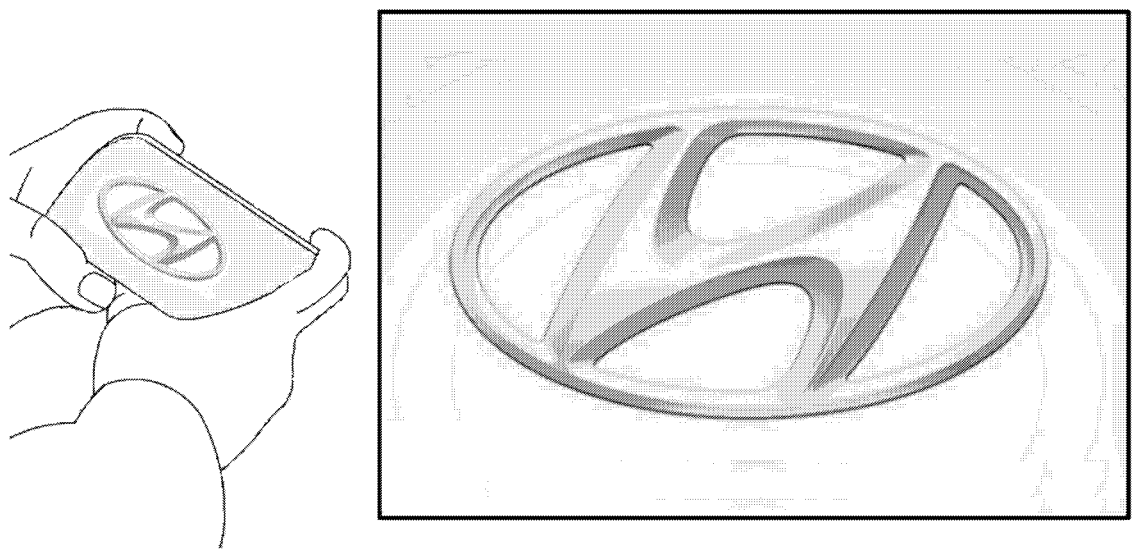
Figure 8C:
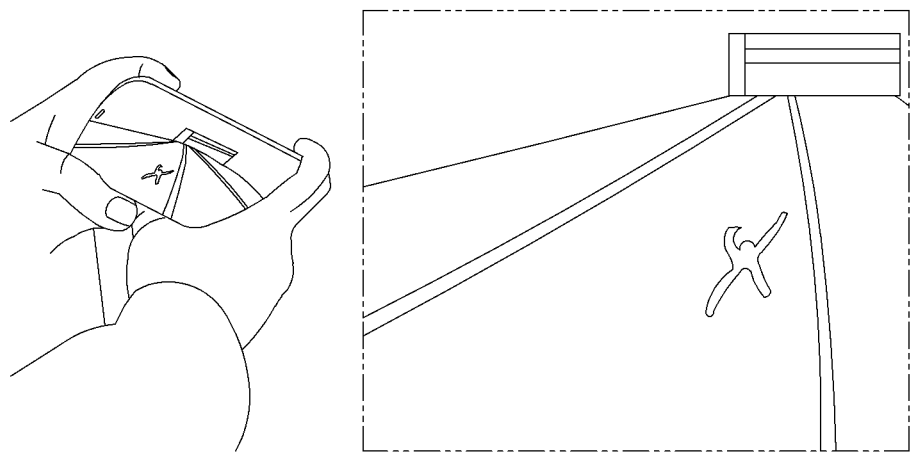

FIGS. 8A to 8C illustrate an embodiment for performing a control operation to display media content using a lamp device.

Referring to FIGS. 8A to 8C, the user may input a voice command for requesting displaying media content. Accordingly, the lamp control system 100 may display a media content screen through a digital lamp, depending on the control intent of the user.

The lamp control system 100 may display a movie reproduction screen on a specific external area through the digital lamp as illustrated in FIG. 8A. In this case, the lamp control system 100 may be connected to the cloud server 200 to receive a movie screen. Meanwhile, the lamp control system 100 may be connected to a media device, such as a smartphone, in the vicinity and may display, on the specific external area, a sharing screen of the smartphone through a digital lamp, as illustrated FIGS. 8B and 8C.

According to the present embodiment, a device to operate as described above may be implemented in the form of an independent hardware device including a memory and a processor to process each operation, and may be run in the form included in another hardware device such as a microprocessor or a general purpose computer system.

The flowchart of the operation of the system according to the present disclosure will be described below.

Figure 9:
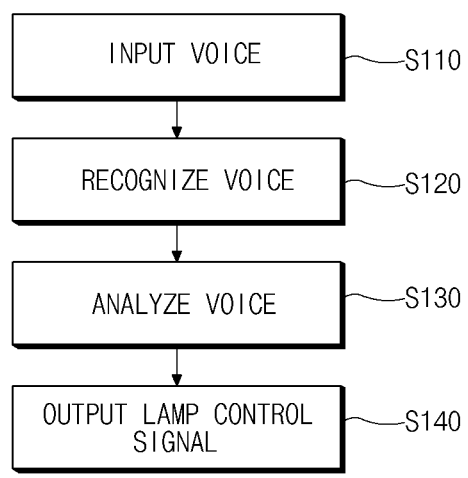
FIGS. 9 to 11 are flowcharts illustrating the operations for a method for controlling a lamp of a vehicle, according to an embodiment of the present disclosure.
Figure 10:
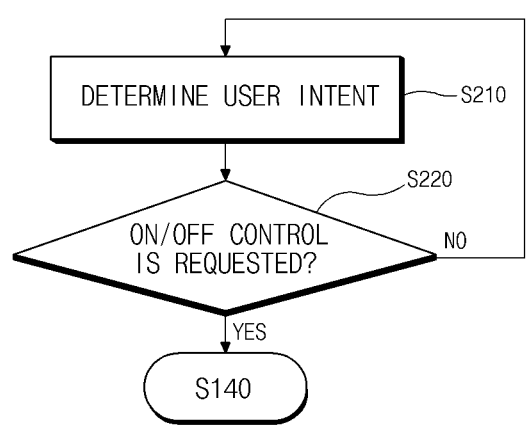
Figure 11:
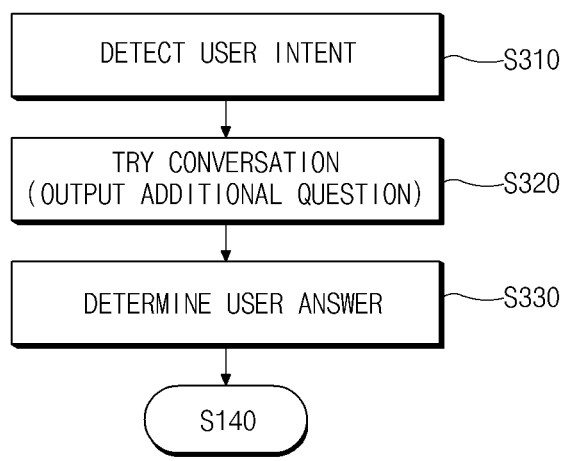

FIGS. 9 to 11 are flowcharts illustrating the operations for a method for controlling a lamp of a vehicle, according to an embodiment of the present disclosure.

First, referring to FIG. 9, the lamp control system 100 recognizes a voice signal of a user which is input in S110 (S120), when the voice of the user is input through a microphone (S110).

In this case, the lamp control system 100 analyzes context of the voice signal recognized in S120 (S130). The lamp control system 100 may detect the voice command from the user and may determine the control intent of the user with respect to the voice command, in S130.

For example, when a voice for controlling the lamp device 50 is input from the user in S110, the lamp control system 100 may analyze the context of the voice, based on the voice signal recognized in S120 to recognize the target lamp device to be controlled, and may detect the control command for the recognized lamp device 50. In this case, the lamp control system 100 determines the control intent of the user with respect to the detected control command, and may output a lamp control signal to the target lamp device based on the control intent (S140).

Accordingly, the lamp device 50 may be controlled, based on the lamp control signal output in S140. In this case, the lamp control signal may be merely a control signal to control an "on" operation or an "off" operation of the target lamp device. Meanwhile, the lamp control signal may be a control signal to adjust the brightness or the color of the target lamp device, to display specific information on a vehicle body or a road surface or to display media content.

Accordingly, as illustrated in FIG. 10, the lamp control system 100 may determine the control intent of the user with respect to the voice command (S120), and may determine whether the determined control intent of the user is merely a request for controlling an "on" operation or an "off" operation of the target lamp device.

In this case, the lamp control system 100 may output a lamp control signal for controlling the "on" operation or the "off" operation of the target lamp device through S140 of FIG. 9, when the control intent of the user is a request for controlling the "on" operation or the "off" operation of the target lamp device (S220).

As illustrated in FIG. 11, the lamp control system 100 may determine the control intent of the user with respect to a voice command (S310), and may output an additional question to attempt the conversation with the user (S320), when it is determined that the control intent of the user detected in S310 is not merely the request for controlling the "on" operation or the "off" operation of the target lamp device.

In this case, the lamp control system 100 determines a user answer to the additional question (S330) The lamp control system 100 may primarily determine the control intent of the user in S310, and may exactly and secondarily determine the control intent of the user through the answer in S330.

Thereafter, the lamp control system 100 may control the target lamp device by outputting the lamp control signal to the target lamp device, depending on the control intent of the user through S140 of FIG. 9.

According to the present disclosure, the lamp of the vehicle may be easily controlled through the voice recognition function.

In addition, according to the present disclosure, the control intent of the user may be exactly detected through the conversation with the user, when the voice recognition function is performed, and the lamp device may be controlled based on the determined control intent of the user to improve the convenience of the user and to improve the satisfaction of the user.

The above description is merely an example of the technical idea of the present disclosure, and various modifications and modifications may be made by one skilled in the art without departing from the essential characteristic of the invention.

Accordingly, embodiments of the present disclosure are intended not to limit but to explain the technical idea of the present disclosure, and the scope and spirit of the invention is not limited by the above embodiments. The scope of protection of the present disclosure should be construed by the attached claims, and all equivalents thereof should be construed as being included within the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for controlling a lamp of a vehicle, comprising:
a voice recognition device configured to recognize a voice from a user;
a voice analyzing device configured to:
analyze context of the recognized voice; and
based on the analyzed context, identify a target lamp device to be controlled and determine an intent of the user to control the target lamp device; and
a controller configured to control the target lamp device based on the determined intent of the user,
wherein, for determining the intent of the user to control the target lamp device, the voice analyzing device is configured to:
determine whether the intent of the user is to turn on or off the identified target lamp device accordingly;
in response to determining that the intent of the user is not to turn on or off the target lamp device, cause an output device to output a request for additional information on the intent of the user;
receive, from the voice recognition device, the additional information from the user;

determine, based on a driving/parking status of the vehicle, a ground/surrounding of the vehicle and one or more objects around the vehicle, which one of a plurality of analysis modes the intent of the user is to be determined in, wherein the plurality of analysis modes comprises:
a user mode for controlling the identified target lamp device to support an activity of the user;
an outdoor switching mode for controlling the identified target lamp device to support switching for an outdoor lamp of the vehicle; and
a leisure mode for controlling the identified target lamp device to support a leisure activity of the user; and
determine, based on the received additional information, the intent of the user to control the target lamp device in the determined one of the plurality of analysis modes.

2. The system of claim 1, wherein the target lamp device includes one or more of an indoor lamp, a head lamp, a rear lamp, a grill lamp, a puddle lamp, a vehicle body lamp, and a lamp for displaying road surface information disposed at an exterior of the vehicle.

3. The system of claim 1, wherein, in response to the voice analyzing device determining that the intent of the user is to change a brightness or color of the target lamp device, the controller adjusts the brightness or color of the target lamp device.

4. The system of claim 1, wherein, in response to the voice analyzing device determining that the intent of the user is to display information on a vehicle body, the controller generates a vehicle body message and controls a vehicle body lamp to display the vehicle body message.

5. The system of claim 1, wherein, in response to the voice analyzing device determining that the intent of the user is to display road surface information, the controller generates a road surface message and controls the target lamp device to display the road surface information.

6. The system of claim 1, wherein, in response to the voice analyzing device determining that the intent of the user is to display media content, the controller performs:
Requesting a media device or server to share a screen showing the media content; and
controlling the target lamp device to display the shared screen showing the media content.

7. The system of claim 1, wherein in response to the voice analyzing device determining that the intent of the user is to perform a software update, the controller connects to a server to perform the software update.

8. The system of claim 1, wherein the plurality of analysis modes comprises:
a user mode for controlling the identified target lamp device to support an activity of the user when the vehicle is parked at a parking lot and more than a predetermined number of vehicles are detected in a vicinity of the vehicle;
the outdoor switching mode for controlling the identified target lamp device to support switching for the outdoor lamp of the vehicle when the vehicle is moving on a paved road and more than a predetermined number of vehicles are detected in the vicinity of the vehicle; and
the leisure mode for controlling the identified target lamp device to support a leisure activity of the user when the vehicle is parked on an unpaved road and more than a predetermined number of tress are detected in the vicinity of the vehicle.

9. A method of controlling a lamp of a vehicle, comprising:
performing voice recognition to recognize a voice from a user;
analyzing context of the recognized voice;
based on the analyzed context, identifying a target lamp device to be controlled and determining an intent of the user to control the target lamp device; and
controlling the target lamp device based on the intent of the user,
wherein determining the intent of the user to control the target lamp device comprises:
determine whether the intent of the user is to turn on or off the identified target lamp device accordingly;
in response to determining that the intent of the user is not to turn on or off the target lamp device, cause an output device to output a request for additional information on the intent of the user;
receive, from the voice recognition device, the additional information from the user;
determine, based on a driving/parking status of the vehicle, a ground/surrounding of the vehicle and one or more objects around the vehicle, which one of a plurality of analysis modes the intent of the user is to be determined in, wherein the plurality of analysis modes comprises:
a user mode for controlling the identified target lamp device to support an activity of the user;
an outdoor switching mode for controlling the identified target lamp device to support switching for an outdoor lamp of the vehicle; and
a leisure mode for controlling the identified target lamp device to support a leisure activity of the user; and
determine, based on the received additional information, the intent of the user to control the target lamp device in the determined one of the plurality of analysis modes.

10. The method of claim 9, wherein identifying the target lamp device comprises identifying, as the target lamp device, one or more of an indoor lamp, a head lamp, a rear lamp, a grill lamp, a puddle lamp, a vehicle body lamp, and a lamp for displaying road surface information disposed at an exterior of the vehicle.

11. The method of claim 9, wherein controlling the target lamp device based on the intent of the user comprises, in response to determining that the intent of the user is to change a brightness or color of the target lamp device, adjusting the brightness or color of the target lamp device.

12. The method of claim 9, wherein controlling the target lamp device based on the intent of the user comprises, in response to determining that the intent of the user is to display information on a vehicle body, generating a vehicle body message and controlling a vehicle body lamp to display the vehicle body message.

13. The method of claim 9, wherein controlling the target lamp device based on the intent of the user comprises, in response to determining that the intent of the user is to display road surface information, generating a road surface message and controlling the target lamp device to display the road surface information.

14. The method of claim 9, wherein controlling the target lamp device based on the intent of the user comprises, in response to determining that the intent of the user is to display media content, performing:
Requesting a media device or server to share a screen showing the media content; and
controlling the target lamp device to display the shared screen showing the media content.

15. The method of claim 9, wherein controlling the target lamp device based on the intent of the user comprises, in response to determining that the intent of the user is to perform a software update, connecting to a server to perform the software update.

16. The method of claim 9, wherein the plurality of analysis modes comprises:
a user mode for controlling the identified target lamp device to support an activity of the user when the vehicle is parked at a parking lot and more than a predetermined number of vehicles are detected in a vicinity of the vehicle;
the outdoor switching mode for controlling the identified target lamp device to support switching for the outdoor lamp of the vehicle when the vehicle is moving on a paved road and more than a predetermined number of vehicles are detected in the vicinity of the vehicle; and
the leisure mode for controlling the identified target lamp device to support a leisure activity of the user when the vehicle is parked on an unpaved road and more than a predetermined number of tress are detected in the vicinity of the vehicle.

* * * * *